(12) United States Patent
Rathore et al.

(10) Patent No.: US 12,043,638 B2
(45) Date of Patent: Jul. 23, 2024

(54) CYCLIC SILOXANES, COMPOSITIONS, METHODS, AND ARTICLES

(71) Applicant: 3M INNOVATIVE PROPERTIES COMPANY, St. Paul, MN (US)

(72) Inventors: Jitendra S. Rathore, Woodbury, MN (US); Chetan P. Jariwala, Woodbury, MN (US); Lin Chen, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 278 days.

(21) Appl. No.: 16/641,025

(22) PCT Filed: Sep. 13, 2018

(86) PCT No.: PCT/IB2018/057023
§ 371 (c)(1),
(2) Date: Feb. 21, 2020

(87) PCT Pub. No.: WO2019/058229
PCT Pub. Date: Mar. 28, 2019

(65) Prior Publication Data
US 2021/0198290 A1 Jul. 1, 2021

Related U.S. Application Data

(60) Provisional application No. 62/561,878, filed on Sep. 22, 2017.

(51) Int. Cl.
| | |
|---|---|
| *C07F 7/02* | (2006.01) |
| *C08G 77/04* | (2006.01) |
| *D06M 13/513* | (2006.01) |
| *D06M 15/643* | (2006.01) |

(52) U.S. Cl.
CPC .............. *C07F 7/02* (2013.01); *C08G 77/045* (2013.01); *D06M 13/5135* (2013.01); *D06M 15/6436* (2013.01); *D06M 2200/12* (2013.01)

(58) Field of Classification Search
CPC . C07F 7/0838; C07F 7/02; C07F 7/21; C08G 77/20; C08G 77/22; C08G 77/045; D06M 13/5135; D06M 15/6436; D06M 2200/12
See application file for complete search history.

(56) References Cited

U.S. PATENT DOCUMENTS

| | | | | |
|---|---|---|---|---|
| 3,371,104 A * | 2/1968 | Rossmy | ............... | C07F 7/0838 252/8.57 |
| 3,756,052 A * | 9/1973 | Quaal | .................. | B22F 9/00 508/208 |
| 4,758,637 A * | 7/1988 | Merrifield | ............. | C08G 63/00 525/474 |
| 5,246,703 A * | 9/1993 | Durfee | ................ | C10M 107/50 556/460 |
| 5,580,943 A * | 12/1996 | Nakashima | ............... | C07F 7/21 548/347.1 |
| 5,679,335 A | 10/1997 | Legrow | | |
| 6,294,634 B1 * | 9/2001 | Ferritto | .................. | C08G 77/46 528/21 |
| 7,482,419 B2 | 1/2009 | Caprasse | | |
| 7,595,370 B2 * | 9/2009 | Plehiers | ............... | C09D 183/06 526/279 |
| 7,674,764 B2 * | 3/2010 | Leaym | ............... | D06M 15/643 512/2 |
| 7,736,634 B2 * | 6/2010 | Plehiers | ............... | C08G 77/045 526/279 |
| 8,360,565 B2 * | 1/2013 | Kimura | ............... | C09D 11/033 524/588 |
| 9,273,163 B2 | 3/2016 | Crowther | | |
| 9,453,109 B2 | 9/2016 | Rathore | | |

(Continued)

FOREIGN PATENT DOCUMENTS

| | | | | |
|---|---|---|---|---|
| DE | | 1793653 A * | 5/1972 | |
| DE | | 1793653 A * | 10/1972 | ............ C07F 7/0861 |

(Continued)

OTHER PUBLICATIONS

CAS Abstract G. Legrow et al., U.S. Pat. No. 5,679,335 (1997) (Year: 1997).*
I. Brown, 113 J. Anat., 159-168 (1972) (Year: 1972).*
Hawley's Condensed Chemical Dictionary, p. 1259 (16th ed., 2016, R.J. Larrañaga ed.) (Year: 2016).*
CAS Abstract and Indexed Compounds, T. Nanba et al., JP 07041413 (1995) (Year: 1995).*
Hawley's Condensed Chemical Dictionary, pp. 1434-1435 (16th ed., 2016, R.J. Larrañaga ed.) (Year: 2016).*
J. Hopken et al., 2 New Polymeric Materials, 339-356 (1991) (Year: 1991).*
CAS Abstract and Indexed Compounds, J. Hopken et al., 2 New Polymeric Materials, 339-356 (1991) (Year: 1991).*

(Continued)

*Primary Examiner* — Alexander R Pagano
(74) *Attorney, Agent, or Firm* — Jean A. Lown; Julie Lapos-Kuchar

(57) ABSTRACT

A cyclic siloxane compound, composition, method, and an article including the siloxane, wherein the cyclic siloxane has the following Formula (I): wherein: each $R^1$ and $R^2$ is independently a (C1-C4)alkyl; each $L^1$ and $L^2$ is independently a single bond, an alkylene, or an alkylene bonded to a group selected from oxy, thio, carbonyl, —NH—, and combinations thereof; each R3 is independently a linear (C14-C100)alkyl; each R4 is independently a (C1-C30) alkyl, a (C2-C30)heteroalkyl having at least one oxygen, sulfur, or —NH— group, or a (C1-C30)alkyl substituted with a fluoro, thiol, isocyanato, cyanato, hydroxyl, glycidoxy, or epoxy group; with the proviso that $L^1$, L2, and $R^4$ are selected such that each Si atom is directly bonded to an alkylene or an alkyl; m is an integer of at least 2; n is an integer of 0 or above; m+n is an integer of at least 3; and the cyclic siloxane compound is a solid at 25° C.

16 Claims, No Drawings

(56) References Cited

U.S. PATENT DOCUMENTS

| | | |
|---|---|---|
| 9,463,584 B2 | 10/2016 | Guha |
| 9,663,690 B2 | 5/2017 | Chatterjee |
| 2007/0026226 A1 | 2/2007 | Chen |
| 2007/0066699 A1* | 3/2007 | Kohno .................. C08L 83/06 522/6 |
| 2007/0205399 A1* | 9/2007 | Mizori .................. C09J 5/00 252/500 |
| 2009/0171014 A1 | 7/2009 | Hergenrother |
| 2011/0060100 A1* | 3/2011 | Kimura ............... C09D 11/101 524/588 |
| 2011/0301254 A1 | 12/2011 | Knott |
| 2014/0088213 A1 | 3/2014 | Kulkarni |
| 2015/0038037 A1 | 2/2015 | Coppens |
| 2015/0090160 A1 | 4/2015 | Taomoto |
| 2016/0024707 A1 | 1/2016 | Aydin |
| 2016/0319156 A1 | 11/2016 | Rathore |
| 2020/0270478 A1* | 8/2020 | Lin ....................... C08G 77/26 |

FOREIGN PATENT DOCUMENTS

| | | | | |
|---|---|---|---|---|
| DE | 1793653 B | * | 10/1972 | ............ C07F 7/0861 |
| JP | 01294612 A | * | 11/1989 | ............ A61K 8/585 |
| JP | 03192126 A | * | 8/1991 | |
| JP | 03292329 A | * | 12/1991 | |
| JP | 04013769 A | * | 1/1992 | |
| JP | 07041413 A | * | 2/1995 | |
| JP | 09227685 A | * | 9/1997 | |
| JP | 2004133436 A | * | 4/2004 | |
| JP | 2006-219570 | | 8/2006 | |
| JP | 2011057900 A | * | 3/2011 | |
| JP | 2013-237825 | | 11/2013 | |
| JP | 2013237825 A | * | 11/2013 | ............ C08G 77/14 |
| WO | WO 2013-162704 | | 10/2013 | |
| WO | WO 2014-074372 | | 5/2014 | |
| WO | WO 2014-099699 | | 6/2014 | |
| WO | WO 2014-139931 | | 9/2014 | |
| WO | WO 2016-133667 | | 8/2016 | |
| WO | WO 2019-058228 | | 3/2019 | |
| WO | WO 2019-058231 | | 3/2019 | |
| WO | WO 2019-058232 | | 3/2019 | |

OTHER PUBLICATIONS

CAS Abstract and Indexed Compounds, G. Rossmy, DE 1793653 (1972) (Year: 1972).*

C. Luellmann et al., 323 Journal of Chromatography, 273-280 (1985) (Year: 1985).*

AATCC Test Method 22-1996, "Water Repellency: Spray Test", Technical Manual of the American Association of Textile Chemists and Colorists, 2001, pp. 63-65.

Clarson, "Siloxane Polymer—Table of contents", Prentice Hall: Englewood Cliffs, 1993, 9pages.

Encyclopedia of Polymer Science and Engineering, Wiley-Interscience Publishers, New York, 1988, vol. 13, 3pages.

Encyclopedia of Polymer Science and Technology, Interscience Publishers, New York, 1964, vol. 1, 24pages.

Kirk-Othmer, Encyclopedia of Polymer Science and Engineering, Wiley-Interscience Publication, 1989, vol. 15, Ed.2, pp. 235-243.

Noll, "Chemistry and Technology of Silicones", Academic Press, 1960, pp. 585-595.

Tomanek, "Silicones and Industry: A Compendium for Practical Use, Instruction, and Reference", Munich, 1990, 4pages.

Wilkinson, "Comprehensive Organometallic Chemistry", Pergamon Press, New York 1982, vol. 2, pp. 329-330.

International Search report for PCT International Application No. PCT/IB2018/057023 mailed on Nov. 6, 2018, 4 pages.

* cited by examiner

CYCLIC SILOXANES, COMPOSITIONS, METHODS, AND ARTICLES

CROSS REFERENCE TO RELATED APPLICATIONS

This application is a national stage filing under 35 U.S.C. 371 of PCT/IB2018/057023, filed Sep. 13, 2018, which claims the benefit of U.S. Provisional Patent Application No. 62/561,878, filed Sep. 22, 2017, the disclosures of which are incorporated by reference herein in its/their entirety.

BACKGROUND

Traditionally, water-repellent fabrics have been due to the application of a fluorochemical to the fabric; however, fluorine-free materials are more desirable in some applications. Thus, there is a desire for new fluorine-free materials.

SUMMARY OF THE DISCLOSURE

The present disclosure provides cyclic siloxane compounds as well as compositions including such compounds, methods of using such compounds (e.g., to treat fibrous substrates), and articles including such compounds in hydrophobic layers.

In one embodiment, a cyclic siloxane compound, and an article including the siloxane, wherein the cyclic siloxane has the following Formula (I):

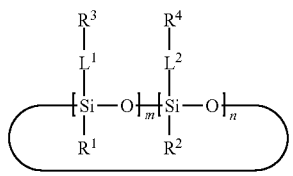

wherein:
each $R^1$ and $R^2$ is independently a (C1-C4)alkyl;
each $L^1$ and $L^2$ is independently a single bond, an alkylene, or an alkylene bonded to a group selected from oxy, thio, carbonyl, —NH—, and combinations thereof,
each $R^3$ is independently a linear (C14-C100)alkyl;
each $R^4$ is independently a (C1-C30)alkyl, a (C2-C30) heteroalkyl having at least one oxygen, sulfur, or —NH— group, or a (C1-C30)alkyl substituted with a fluoro, thiol, isocyanato, cyanato, hydroxyl, glycidoxy, or epoxy group;
with the proviso that $L^1$, $L^2$, and $R^4$ are selected such that each Si atom is directly bonded to an alkylene or an alkyl (other than $R^1$ and $R^2$);
m is an integer of at least 2;
n is an integer of 0 or above;
m+n is an integer of at least 3; and
the cyclic siloxane compound is a solid at 25° C.

In another embodiment, an article is provided that includes: a substrate; and a hydrophobic layer including a cyclic siloxane of the present disclosure adjacent to the substrate.

In another embodiment, a coating composition (e.g., a treating composition, preferably, an aqueous treating composition) is provided that includes a cyclic siloxane of the present disclosure. In another embodiment, a method of treating a fibrous substrate is provided that includes applying to the fibrous substrate a treating composition as described herein in an amount sufficient to make the fibrous substrate water repellent. In another embodiment, a fibrous substrate treated by such method is provided.

As used herein, "alkyl" refers to a monovalent group that is a radical of an alkane and includes straight-chain (i.e., linear), branched, cyclic, and bicyclic alkyl groups, and combinations thereof, including both unsubstituted and substituted alkyl groups. Unless otherwise indicated, the alkyl groups typically contain from 1 to 100 carbon atoms. In some embodiments, the alkyl groups contain 1 to 60 carbon atoms, 1 to 30 carbon atoms, 1 to 10 carbon atoms, 1 to 6 carbon atoms, 1 to 4 carbon atoms, or 1 to 3 carbon atoms. Examples of "alkyl" groups include, but are not limited to, methyl, ethyl, n-propyl, n-butyl, n-pentyl, isobutyl, t-butyl, isopropyl, n-octyl, n-heptyl, ethylhexyl, cyclopentyl, cyclohexyl, cycloheptyl, adamantyl, norbornyl, and the like.

The term "alkylene" refers to a divalent group that is a radical of an alkane and includes groups that are linear, branched, cyclic, bicyclic, or a combination thereof. Unless otherwise indicated, the alkylene group typically has 1 to 100 carbon atoms. In some embodiments, the alkylene group has 1 to 60 carbon atoms, 1 to 30 carbon atoms, 1 to 10 carbon atoms, 1 to 6 carbon atoms, or 1 to 4 carbon atoms. Examples of "alkylene" groups include methylene, ethylene, propylene, 1,4-butylene, 1,4-cyclohexylene, and 1,4-cyclohexyldimethylene.

The term "heteroalkyl" means an alkyl group having at least one —CH$_2$— replaced with a heteroatom such as —NH—, —O—, or —S—.

The term "carbonyl" means a divalent group of formula —C(O)— where the carbon atoms is bonded to the oxygen with a double bond.

The term "oxy" means a divalent group of formula —O—.

The term "thio" means a divalent group of formula —S—.

The term "hydroxyl" means a monovalent group of formula —OH.

The term "thiol" means a monovalent group of formula —SH.

The term "isocyanato" means a monovalent group of formula —N=C=O.

The term "cyanato" means a monovalent group of formula —CN.

The term "glycidoxy" (also known as glycidyloxy) means an oxiran-2-yl-methyloxy group of the formula:

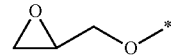

wherein the (*) represents the point of attachment to a molecule.

The term "epoxy" means an oxiranyl group of the formula:

wherein the (*) represents the point of attachment to a molecule.

The term "hydrophobic layer" means a layer on which a water droplet has a contact angle of at least 90 degrees.

Herein, the term "comprises" and variations thereof do not have a limiting meaning where these terms appear in the description and claims. Such terms will be understood to imply the inclusion of a stated step or element or group of steps or elements but not the exclusion of any other step or element or group of steps or elements. By "consisting of" is meant including, and limited to, whatever follows the phrase "consisting of." Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements. Any of the elements or combinations of elements that are recited in this specification in open-ended language (e.g., comprise and derivatives thereof), are considered to additionally be recited in closed-ended language (e.g., consist and derivatives thereof) and in partially closed-ended language (e.g., consist essentially, and derivatives thereof).

The words "preferred" and "preferably" refer to embodiments of the disclosure that may afford certain benefits, under certain circumstances. However, other claims may also be preferred, under the same or other circumstances. Furthermore, the recitation of one or more preferred claims does not imply that other claims are not useful, and is not intended to exclude other claims from the scope of the disclosure.

In this application, terms such as "a," "an," and "the" are not intended to refer to only a singular entity, but include the general class of which a specific example may be used for illustration. The terms "a," "an," and "the" are used interchangeably with the term "at least one." The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise.

The term "and/or" means one or all of the listed elements or a combination of any two or more of the listed elements.

Also herein, all numbers are assumed to be modified by the term "about" and in certain embodiments, preferably, by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used. Herein, "up to" a number (e.g., up to 50) includes the number (e.g., 50).

Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

As used herein, the term "room temperature" refers to a temperature of 20° C. to 25° C. or 22° C. to 25° C.

The term "in the range" or "within a range" (and similar statements) includes the endpoints of the stated range.

Groupings of alternative elements or embodiments disclosed herein are not to be construed as limitations. Each group member may be referred to and claimed individually or in any combination with other members of the group or other elements found therein. It is anticipated that one or more members of a group may be included in, or deleted from, a group for reasons of convenience and/or patentability.

When any such inclusion or deletion occurs, the specification is herein deemed to contain the group as modified thus fulfilling the written description of all Markush groups used in the appended claims.

When a group is present more than once in a formula described herein, each group is "independently" selected, whether specifically stated or not. For example, when more than one L group is present in a formula, each L group is independently selected.

Reference throughout this specification to "one embodiment," "an embodiment," "certain embodiments," or "some embodiments," etc., means that a particular feature, configuration, composition, or characteristic described in connection with the embodiment is included in at least one embodiment of the invention. Thus, the appearances of such phrases in various places throughout this specification are not necessarily referring to the same embodiment of the invention. Furthermore, the particular features, configurations, compositions, or characteristics may be combined in any suitable manner in one or more embodiments.

The above summary of the present disclosure is not intended to describe each disclosed embodiment or every implementation of the present invention. The description that follows more particularly exemplifies illustrative embodiments. In several places throughout the application, guidance is provided through lists of examples, which examples may be used in various combinations. In each instance, the recited list serves only as a representative group and should not be interpreted as an exclusive list. Thus, the scope of the present disclosure should not be limited to the specific illustrative structures described herein, but rather extends at least to the structures described by the language of the claims, and the equivalents of those structures. Any of the elements that are positively recited in this specification as alternatives may be explicitly included in the claims or excluded from the claims, in any combination as desired. Although various theories and possible mechanisms may have been discussed herein, in no event should such discussions serve to limit the claimable subject matter.

DETAILED DESCRIPTION OF ILLUSTRATIVE EMBODIMENTS

The present disclosure provides cyclic siloxane compounds as well as compositions including such compounds, methods of using such compounds (e.g., to treat fibrous substrates), and articles including such cyclic compounds in hydrophobic layers.

The cyclic siloxane compounds of the present disclosure generally display excellent water repellent properties when applied to a substrate, whether it has a smooth or textured surface. The unique structure of the cyclic siloxane compounds allows the hydrocarbon chains to co-crystallize. As a result, they have superior water repellent properties (e.g., greater contact angles) compared to long-chain hydrocarbon compounds. See, for example, the water contact angles presented in Table 1 of the Examples Section. In particular, compare the water contact angles for Comparative Examples C5, C6, C7, and C8 for hydrocarbon compounds with chain lengths of 16 carbons, 18 carbons, 26 carbons, and 18 carbons with oxygen to the water contact angles of Example 2, 3, 4, and 6, respectively, for the corresponding cyclic siloxane compounds with the same hydrocarbon chain lengths (i.e., the corresponding cyclic siloxane compounds that include at least two $R^3$ groups having at least 14 carbons in the hydrocarbon groups). Also, the water contact angles for the cyclic siloxane compounds of the present disclosure, which include at least two $R^3$ groups having at least C14 hydrocarbon groups (in Examples 1-8), are greater than cyclic siloxanes having less than 14 carbon atoms in the hydrocarbon groups (in Comparative Examples C9-C11), as well as hydrocarbon compounds having less than 14 carbon atoms (in Comparative Examples C2-C4).

In one embodiment, a cyclic siloxane compound is provided that is solid at 25° C. and has Formula (I):

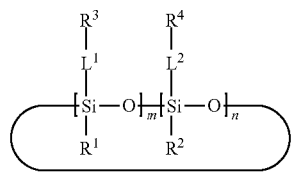

wherein this structure indicates the building blocks of the compound. In typical compounds, the -$L^1$-$R^3$-containing repeat units and the -$L^2$-$R^4$-containing units are randomly distributed therein.

In Formula (I), each $R^1$ and $R^2$ is independently a (C1-C4)alkyl (e.g., methyl group). In certain embodiments, each $R^1$ and $R^2$ is a methyl group.

In Formula (I), each $L^1$ and $L^2$ is independently a single bond, an alkylene, or an alkylene bonded to a group selected from oxy, thio, carbonyl, —NH—, and combinations thereof (e.g., carbonyloxy (—C(O)—O—) or carbonylamino (—C(O)—NH—)). Typically, in each of $L^1$ and $L^2$ there is only one of such group or combination thereof (e.g., only one oxy, thio, carbonyl, —NH—, carbonyloxy, or carbonylamino).

In certain embodiments, each $L^1$ is a single bond. In certain embodiments, at least a portion of the $L^1$ groups are single bonds, and at least a portion of the $L^1$ groups are an alkylene bonded to a group selected from oxy, thio, carbonyl, —NH—, and combinations thereof.

In certain embodiments, each $L^2$ is a single bond. In certain embodiments, at least a portion of the $L^2$ groups are single bonds, and at least a portion of the $L^2$ groups are an alkylene bonded to a group selected from oxy, thio, carbonyl, —NH—, and combinations thereof.

In Formula (I), each $R^3$ is independently a linear (C14-C100)alkyl. The group R3 can have at least 14, at least 16, at least 18, at least 20, at least 24, or at least 30 carbon atoms and up to 100, up to 80, up to 60, up to 40, or up to 30 carbon atoms. In certain embodiments, each $R^3$ is independently a linear (C14-C60)alkyl. In certain embodiments, each R is independently a linear (C16-C60)alkyl. In certain embodiments, each R is independently a linear (C18-C30)alkyl.

In Formula (I), each $R^4$ is independently a (C1-C30)alkyl, a (C2-C30)heteroalkyl having at least one oxygen, sulfur, or —NH— group (in certain embodiments, multiples of such hetero groups are included), or a (C1-C30)alkyl substituted with a fluoro, thiol, isocyanato, cyanato, hydroxyl, glycidoxy, or epoxy group. The number of carbon atoms can be at least 2, at least 6, at least 6, at least 10, or at least 12 and up to 30, up to 24, up to 20, up to 18, or up to 12. Such groups may be nonreactive or reactive to allow, for example, bonding to a substrate.

In certain embodiments, each $R^4$ is independently a (C1-C30)alkyl. In certain embodiments, each $R^4$ is independently a (C2-C30)heteroalkyl having at least one oxygen, sulfur, or —NH— group, or a (C1-C30)alkyl substituted with a fluoro, thiol, isocyanato, cyanato, hydroxyl, glycidoxy, or epoxy group.

In certain embodiments, at least a portion of the $R^4$ groups are independently a (C1-C30)alkyl, and at least a portion of the $R^4$ groups are independently a (C2-C30)heteroalkyl having at least one oxygen, sulfur, or —NH— group, or a (C1-C30)alkyl substituted with a fluoro, thiol, isocyanato, cyanato, hydroxyl, glycidoxy, or epoxy group. The number of carbon atoms can be at least 2, at least 6, at least 6, at least 10, or at least 12 and up to 30, up to 24, up to 20, up to 18, or up to 12. Such groups may be nonreactive or reactive to allow, for example, bonding to a substrate.

In Formula (I), $L^1$, $L^2$, and $R^4$ are selected such that each Si atom is directly bonded to an alkylene or an alkyl (other than $R^1$ and $R^2$).

In Formula (I), m is an integer of at least 2, at least 3, at least 5, or at least 10.

In Formula (I), n is an integer of 0 or above such as 1, 2, 3, 5, or 10. In certain embodiments, n is equal to 0.

In Formula (I), m+n is an integer of at least 3. In certain embodiments of Formula (I), m+n is an integer of at least 10 (or at least 15). In certain embodiments of Formula (I), m+n is an integer of up to 250 (or up to 200, or up to 175, or up to 150, or up to 125, or up to 50, or up to 25).

In certain embodiments of Formula (I), m÷(m+n) is at least 0.50 (or at least 0.70, or at least 0.90). In certain embodiments of Formula (T), m÷(m+n) is up to 1.0.

In certain embodiments, the cyclic siloxane compound of the present disclosure has a (number average) molecular weight of at least 1000 Daltons. In certain embodiments, the cyclic siloxane compound of the present disclosure has a (number average) molecular weight of up to 75,000 Daltons. For example, the (number average) molecular weight can be at least 2000 Daltons, at least 5000 Daltons, at least 10,000 Daltons, at least 20 Daltons, at least 25 Daltons, at least 30 Daltons and up to 75,000 Daltons, up to 60,000 Daltons, up to 50,000 Daltons, up to 20,000 Daltons, or up to 10,000 Daltons.

Cyclic siloxane compounds of the present disclosure can be made using well-known techniques, as exemplified in the Examples Section. For example, cyclic siloxane compounds described herein can be prepared by a precious-metal (platinum, ruthenium, rhodium, etc.) catalyzed hydrosilation or hydrosilylation addition reaction of alkene-containing moieties with silicon-hydride containing cyclic siloxanes.

Coating (e.g., Treating) Compositions

The present disclosure provides a coating composition for application of a cyclic siloxane compound to a substrate surface. The cyclic siloxane compounds of the present disclosure generally display excellent water repellent properties when applied to a substrate. In certain embodiments, some cyclic siloxane compounds of the present disclosure (particularly those with one or more long (e.g., greater than C26) hydrocarbon chains) can be used in treating compositions, typically aqueous treating compositions, particularly for fibrous substrates. Thus, the present disclosure provides coating compositions, particularly treating compositions, treated fibrous substrates, and treating methods.

In certain embodiments, such compositions are fluorine-free. Herein, a "fluorine-free" composition means that a composition includes less than 1 weight percent (1 wt-%) fluorine in a composition based on solids, whether in a concentrate or ready-to-use composition. In certain embodiments, a "fluorine-free" composition means that a composition includes less than 0.5 wt %, or less than 0.1 wt %, less than 0.5 wt %, or less than 0.01 wt-%, fluorine. The fluorine may be in the form of organic or inorganic fluorine-containing compounds.

Compositions of the present disclosure are useful for treating a fibrous substrate to enhance the substrate's water repellency. As used herein, a fibrous substrate is water repellent if it demonstrates a minimum initial spray rating of at least 50, as determined by the Spray Rating Test described in the Examples Section. In certain embodiments, the initial spray rating is at least 60, at least 70, at least 80, at least 90, or at least 100, as determined by the Spray Rating Test described in the Examples Section.

Typically, a cyclic siloxane compound is selected, and an amount of the treating composition is used on a fibrous substrate, to obtain a desired initial spray rating level. In certain embodiments, the amount of treating composition is at least 0.1 weight percent (wt-%), at least 0.2 wt-%, at least 0.3 wt-%, at least 0.4 wt-%, at least 0.5 wt-%, or at least 0.6 wt-%, SOF (solids on fibrous substrate, e.g., fabric). In certain embodiments, the amount of treating composition is up to 2 wt-%, up to 1.5 wt-%, or up to 1 wt-% SOF (solids on fibrous substrate, e.g., fabric).

Compositions of the present disclosure may be in the form of an aqueous concentrate, which may include up to 80 weight percent (wt-%) water, based on the total weight of the concentrated aqueous composition. Alternatively, compositions of the present disclosure may be in the form of a ready-to-use aqueous formulation, which may include more than 80 wt-% water, at least 85 wt-% water, at least 90 wt-% water, at least 95 wt-% water, or at least 98 wt-% water, based on the total weight of the ready-to-use aqueous composition. In certain embodiments, a ready-to-use aqueous composition of the present disclosure includes up to 99 wt-% water, based on the total weight of the ready-to-use aqueous composition.

The cyclic siloxane compounds of the present disclosure may be dispersed in water using a surfactant or mixture of surfactants in an amount sufficient to stabilize the dispersion. If the cyclic siloxane compounds are made in solution in a solvent, it can be dispersed in water through vigorously mixing and homogenizing with the help of a surfactant or emulsifier and subsequent homogenization, for example, by a Manton Gaulin homogenizer or ultrasound homogenizer. An organic solvent-free dispersion can then be obtained by subsequent distillation of the solvent.

A typical dispersion will contain water in an amount of 70 to 20,000 parts by weight based on 100 parts by weight of cyclic siloxane compound. The amount of water can be at least 100, at least 200, at least 500, at least 1000, or at least 400 parts by weight based on 100 parts by weight of cyclic siloxane compound. In certain embodiments, the surfactant or mixture of surfactants is present in an amount of 1 to 25 parts by weight, 5 to 25 parts by weight, 1 to 15 parts by weight, or 5 to 15 parts by weight, based on 100 parts by weight of cyclic siloxane compound.

Compositions of the present disclosure can include conventional cationic, nonionic, anionic, and/or zwitterionic (i.e., amphoteric) surfactants (i.e., emulsifiers). A mixture of surfactants may be used, e.g., containing nonionic and ionic surfactants. Suitable nonionic surfactants can have high or low HLB values, such as TERGITOL's, TWEEN's, and the like. Suitable cationic surfactants include mono- or bi-tail ammonium salts. Suitable anionic surfactants include sulfonic and carboxylic aliphatic compounds and their salts, such as sodium dodecylbenzene sulphonate (available from Rhodia, France), and the like. Suitable amphoteric surfactants include cocobetaines, sulphobetaines, amine-oxides, and the like. In certain embodiments, surfactants suitable for use in the compositions of the present disclosure are described in International Publication No. WO 2013/162704 (Coppens et al.).

Also, compositions of the present disclosure may further include one or more of a coalescing solvent, an anti-freeze solvent, an emulsifier, or a stabilizer against one or more microorganisms. The amount of such compounds depends on the application, and can be readily determined by one of skill in the art.

A composition for application of a cyclic siloxane compound to a substrate surface can include water, as described above, and/or an organic solvent, if desired. Useful solvents for the coating compositions include those in which the cyclic siloxane compound is soluble at the level desired. Typically, such organic solvent includes toluene, heptane, methyl ethyl ketone, ethyl acetate, and xylene. These solvents can be used alone or as mixtures thereof.

Any amount of organic solvent can be used. For example, a coating composition can include up to 50 wt-% or even more of organic solvent (e.g., up to 99 wt-%). The solvent can be added to provide the desired viscosity to the coating composition. In some embodiments, no solvent or only low levels (e.g., up to 10 wt-%) of organic solvent is used in a coating composition.

A coating composition typically has a viscosity appropriate to the application conditions and method. For example, a material to be brush or roller coated would likely be preferred to have a higher viscosity than a dip coating composition.

In certain embodiments, a coating composition includes at least 5 wt-%, of the cyclic siloxane compound, based on the total weight of the coating composition. In certain embodiments, a coating composition often includes no greater than 80 wt-%, of the cyclic siloxane compound, based on the total weight of the coating composition. The amount of the cyclic siloxane compound can be at least 5 wt-%, at least 10 wt-%, at least 20 wt-%, at least 30 wt-%, at least 40 wt-% and up to 80 wt-%, up to 70 wt-%, up to 60 wt-%, up to 50 wt-%, or up to 40 wt-%, based on the total weight of the coating composition.

A wide variety of coating methods can be used to apply a composition of the present disclosure, such as brushing, spraying, dipping, rolling, spreading, and the like. Other coating methods can also be used, particularly if no solvent is included in the coating composition. Such methods include knife coating, gravure coating, die coating, and extrusion coating, for example.

A coating composition of the present disclosure can be applied in a continuous or patterned layer. Such layer can be disposed on at least a portion of at least one surface of the substrate. If the composition includes an organic solvent, the coated composition can be exposed to conditions that allow the organic solvent to evaporate from the composition.

Articles

The present disclosure also provides an article that includes a substrate and a hydrophobic layer that includes a cyclic siloxane compound as described herein adjacent to the substrate. The present disclosure also provides a fibrous substrate treated with a treating composition that includes a cyclic siloxane compound as described herein.

The substrate may be a hard surface (e.g., floor), a film (e.g., PET film), or a fibrous substrate (e.g., nonwoven web), for example. Useful substrates include ceramics, siliceous substrates, including glass, metal, natural and man-made stone, and polymeric materials, including thermoplastics and thermosets. Exemplary fibrous substrates include textile, leather, carpet, paper, and fabrics (nonwoven, woven, or knitted). Suitable polymer materials (particularly for use in fibrous substrates) include, for example, polyester and nylon.

EXEMPLARY EMBODIMENTS

Embodiment 1 is a cyclic siloxane compound of Formula (I):

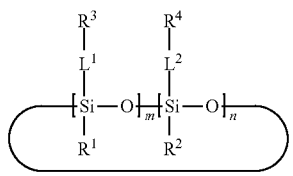

wherein:
each $R^1$ and $R^2$ is independently a (C1-C4)alkyl;
each $L^1$ and $L^2$ is independently a single bond, an alkylene, or an alkylene bonded to a group selected from oxy, thio, carbonyl, —NH—, and combinations thereof,
each $R^3$ is independently a linear (C14-C100)alkyl;
each $R^4$ is independently a (C1-C30)alkyl, a (C2-C30) heteroalkyl having at least one oxygen, sulfur, or —NH— group, or a (C1-C30)alkyl substituted with a fluoro, thiol, isocyanato, cyanato, hydroxyl, glycidoxy, or epoxy group;
with the proviso that $L^1$, $L^2$, and $R^4$ are selected such that each Si atom is directly bonded to an alkylene or an alkyl (other than $R^1$ and $R^2$);
m is an integer of at least 2;
n is an integer of 0 or above;
m+n is an integer of at least 3; and
the cyclic siloxane compound is a solid at 25° C.

Embodiment 2 is the siloxane compound of embodiment 1 wherein m÷(m+n) is at least 0.50 (or at least 0.70, or at least 0.90).

Embodiment 3 is the siloxane compound of embodiment 1 or 2 wherein m÷(m+n) is up to 1.0.

Embodiment 4 is the siloxane compound of any one of embodiments 1 through 3 wherein each $R^3$ is independently a linear (C14-C60)alkyl.

Embodiment 5 is the siloxane compound of embodiment 4 wherein each $R^3$ is independently a linear (C16-C60)alkyl.

Embodiment 6 is the siloxane compound of embodiment 5 wherein each $R^3$ is independently a linear (C18-C30)alkyl.

Embodiment 7 is the siloxane compound of any one of embodiments 1 through 6 wherein each $L^1$ is a single bond.

Embodiment 8 is the siloxane compound of any one of embodiments 1 through 6 wherein at least a portion of the $L^1$ groups are single bonds, and at least a portion of the $L^1$ groups are an alkylene bonded to a group selected from oxy, thio, carbonyl, —NH—, and combinations thereof.

Embodiment 9 is the siloxane compound of any one of embodiments 1 through 8 wherein each $L^2$ is a single bond.

Embodiment 10 is the siloxane compound of any one of embodiments 1 through 8 wherein at least a portion of the $L^2$ groups are single bonds, and at least a portion of the $L^2$ groups are an alkylene bonded to a group selected from oxy, thio, carbonyl, —NH—, and combinations thereof.

Embodiment 11 is the siloxane compound of any one of embodiments 1 through 10 wherein each $R^4$ is independently a (C1-C30)alkyl.

Embodiment 12 is the siloxane compound of any one of embodiments 1 through 10 wherein each $R^4$ is independently a (C2-C30)heteroalkyl having at least one oxygen, sulfur, or —NH— group, or a (C1-C30)alkyl substituted with a fluoro, thiol, isocyanato, cyanato, hydroxyl, glycidoxy, or epoxy group.

Embodiment 13 is the siloxane compound of any one of embodiments 1 through 10 wherein at least a portion of the $R^4$ groups are independently a (C1-C30)alkyl, and at least a portion of the $R^4$ groups are independently a (C2-C30) heteroalkyl having at least one oxygen, sulfur, or —NH— group, or a (C1-C30)alkyl substituted with a fluoro, thiol, isocyanato, cyanato, hydroxyl, glycidoxy, or epoxy group.

Embodiment 14 is the siloxane compound of any one of embodiments 1 through 12 wherein each $R^1$ and $R^2$ is a methyl group.

Embodiment 15 is the siloxane compound of any one of embodiments 1 through 14 wherein n=0.

Embodiment 16 is the siloxane compound of any one of embodiments 1 through 15 wherein m+n is an integer of at least 10 (or at least 15).

Embodiment 17 is the siloxane compound of any one of embodiments 1 through 16 wherein m+n is an integer of up to 250 (or up to 200, or up to 175, or up to 150, or up to 125, or up to 50, or up to 25).

Embodiment 18 is the siloxane compound of any one of embodiments 1 through 17 which has a (number average) molecular weight of at least 1000 Daltons.

Embodiment 19 is the siloxane compound of any one of embodiments 1 through 18 which has a (number average) molecular weight of up to 75,000 Daltons.

Embodiment 20 is an article comprising: a substrate; and a hydrophobic layer comprising a siloxane compound of any one of embodiments 1 through 19 adjacent to the substrate.

Embodiment 21 is the article of embodiment 20 wherein the substrate is a hard surface (e.g., floor).

Embodiment 22 is the article of embodiment 20 wherein the substrate is a film (e.g., PET film).

Embodiment 23 is the article of embodiment 20 wherein the substrate is a fibrous substrate (e.g., nonwoven).

Embodiment 24 is a coating composition (particularly a treating composition) comprising a siloxane compound of any one of embodiments 1 through 19.

Embodiment 25 is the composition of embodiment 24 which is an aqueous treating composition comprising water, and in certain embodiments, an aqueous fluorine-free treating composition.

Embodiment 26 is the composition of embodiment 24 or 25 wherein the composition further comprises one or more surfactants.

Embodiment 27 is the composition of any one of embodiments 24 through 26 wherein the composition further comprises one or more additives selected from a surfactant, a coalescing solvent, an anti-freeze solvent, an emulsifier, and a stabilizer against one or more microorganisms.

Embodiment 28 is a method of treating a fibrous substrate comprising applying to the fibrous substrate a treating composition of any one of embodiments 24 through 27 in an amount sufficient to make the fibrous substrate water repellent.

Embodiment 29 is a fibrous substrate treated by the method of embodiment 28.

Embodiment 30 is the fibrous substrate of embodiment 29 which is selected from the group of textile, leather, carpet, paper, and fabrics (nonwoven, woven, or knitted).

EXAMPLES

These Examples are merely for illustrative purposes and are not meant to be overly limiting on the scope of the appended claims. Notwithstanding that the numerical ranges and parameters setting forth the broad scope of the present disclosure are approximations, the numerical values set forth in the specific examples are reported as precisely as possible. Any numerical value, however, inherently contains certain errors necessarily resulting from the standard deviation found in their respective testing measurements. At the very least, and not as an attempt to limit the application of the doctrine of equivalents to the scope of the claims, each numerical parameter should at least be construed in light of the number of reported significant digits and by applying ordinary rounding techniques.

Unless otherwise noted, all parts, percentages, ratios, etc. in the examples are by weight. Unless otherwise specified, all reagents used in the examples were obtained, or are available, from general chemical suppliers such as, for example, Sigma Aldrich Company, Saint Louis, Missouri, or may be synthesized by conventional methods.

| Materials |
|---|
| 2,4,6,8-Tetramethyl cyclotetrasiloxane, having a molecular weight of 240 grams/mole, a melting point of −69° C., and a boiling point of 134° C., available under product code SIT7530.1 from Gelest, Incorporated, Morrisville, PA. |
| ALPHAPLUS 1-hexene, alpha olefins containing about 99-100 weight percent (wt-%) of olefins having a carbon number of C6 and having an average molecular weight of 84.0 grams/mole, available under the trade designation ALPHAPLUS 1-HEXENE from Chevron Phillips Chemical Company LP, The Woodlands, TX. |
| ALPHAPLUS 1-decene, alpha olefins containing about 96-100 wt-% of olefins having a carbon number of C10 and having an average molecular weight of 140 grams/mole, available under the trade designation ALPHAPLUS 1-DECENE from Chevron Phillips Chemical Company LP, The Woodlands, TX. |
| Dodecane, having a molecular weight of 170 grams/mole, a melting point of −10° C., and a boiling point of 216° C., available from Sigma Aldrich Corporation, St. Louis, MO. |
| 1-Tetradecene, having a molecular weight of 196 grams/mole, a melting point of −11° C., and a boiling point of 251° C., available from Sigma Aldrich Corporation, St. Louis, MO. |
| Hexadecane, having a molecular weight of 226 grams/mole, a melting point of 18° C., and a boiling point of 287° C., available from Sigma Aldrich Corporation, St. Louis, MO. |
| Octadecane, having a molecular weight of 254 grams/mole and a melting point of 26° C. to 29° C., available from Sigma Aldrich Corporation, St. Louis, MO. |
| Hexacosane, having a molecular weight of 367 grams/mole and a melting point of −55° C. to 58° C., available from Sigma Aldrich Corporation, St. Louis, MO. |
| Octadecyl isocyanate, having a molecular weight of 295 grams/mole, a melting point of 15° C. to 16° C., and a boiling point of 172° C. to 173° C. at 5 millimeters Hg, available under product code 305405 from Sigma Aldrich Corporation, St. Louis, MO. |
| ALPHAPLUS 1-dodecene, alpha olefins containing about 95-100 wt-% of olefins having a carbon number of C12 and having an average molecular weight of 168 grams/mole, available under the trade designation ALPHAPLUS 1-DODECENE from Chevron Phillips Chemical Company LP, The Woodlands, TX. |
| ALPHAPLUS 1-Hexadecene, alpha olefins containing about 93-100 wt-% of olefins having a carbon number of C16 and having an average molecular weight of 224 grams/mole, available under the trade designation ALPHAPLUS 1-HEXADECENE from Chevron Phillips Chemical Company LP, The Woodlands, TX. |
| ALPHAPLUS 1-octadecene, alpha olefins containing about 90-100 wt-% of olefins having a carbon number of C18 and having an average molecular weight of 252 grams/mole, available under the trade designation ALPHAPLUS 1-OCTADECENE from Chevron Phillips Chemical Company LP, The Woodlands, TX. |
| ALPHAPLUS C26-28, alpha olefins containing about 58 wt-% of olefins having a carbon number of C26 and about 40 wt-% of olefins having a carbon number of C28, and having an average molecular weight of 378 grams/mole, available under the trade designation ALPHAPLUS C26-28 from Chevron Phillips Chemical Company LP, The Woodlands, TX. |
| ALPHAPLUS C30 + HA, a mixture of alpha olefins containing at least 95.5 wt-% of olefins having a carbon number of C30 or more, with an average molecular weight of 485 grams/mole, available under the trade designation ALPHAPLUS C30 + HA from Chevron Phillips Chemical Company LP, The Woodlands, TX. |
| Dibutyltin dilaurate, available under the product code 291234 from Sigma Aldrich Corporation, St. Louis, MO. |
| Allyl alcohol, having a molecular weight of 58 grams/mole, a melting point of −129° C., and a boiling point of 96-98° C., available under product code 240532 from Sigma Aldrich Corporation, St. Louis, MO. |
| Allyl glycidoxy ether, having a molecular weight of 114 grams/mole and a boiling point of 154° C., available under product code A32608 from Sigma Aldrich Corporation, St. Louis, MO. |
| ETHOQUAD C-12, quarternized coco amine ethoxylate emulsifier (75-78% solids), available from Akzo Nobel, Stenungsund, Sweden. |
| TERGITOL TMN-6, trimethyl nonane polyethylene nonionic surfactant, 90% active in water, available from Dow Chemical Company, Midland, MI. |
| TERGITOL 15-S-30, alkyl polyoxyethylene nonionic surfactant, available from Dow Chemical Company, Midland, MI. |
| Taslan Dobby woven nylon fabric (NTD), having a basis weight of 115 g/m$^2$. The nylon fabric is characterized by the Chinese manufacturer as 70D*160D/166T*83T, dyed and prepared for finishing. |
| Poly Pongee woven polyester fabric (PPP), having a basis weight of 84 g/m$^2$. The polyester fabric is characterized by the Chinese manufacturer as 75D*75D/145T*90T, dyed and prepared for finishing. |

Test Methods

Contact Angle

All of the materials were coated out of toluene solution at 5 wt-% solids using #6 Mayer rod onto the primed side of 0.002 inch (0.05 millimeter) thick polyester film (Mitsubishi HOSTAPHAN 3SAB available from Mitsubishi Polyester Film, Incorporated, Greer, SC). The coated films were dried at 80° C. for 2 minutes in a forced air oven. Static contact angle measurements were made as soon as the samples had cooled to room temperature (20-25° C.) using a Model S/N VCA OPTIMA Instrument (from AST Product Incorporated, Billerica, MA). The contact angles were measured automatically with AutoFAST IMAGING SOFTWARE. A single measurement was made for each sample. A larger contact angle value indicates the material being evaluated has a greater degree of hydrophobicity.

Spray Rating (SR)

The spray rating of a treated substrate is a value indicative of the dynamic repellency of the treated substrate to water that impinges on the treated substrate. The repellency was measured by Test Method 22-1996, published in the 2001 Technical Manual of the American Association of Textile Chemists and Colorists (AATCC), and is expressed in terms of a 'spray rating' of the tested substrate. The spray rating was obtained by spraying 250 milliliters water on the substrate from a height of 15 centimeters. The wetting pattern was visually rated using a 0 to 100 scale, where 0 means complete wetting and 100 means no wetting at all.

Treatment Procedure Via "Padding" Process

The treatments were applied onto the fabric substrates, by immersing the substrates in the treatment dispersion and agitating until the substrate was saturated. The saturated substrate was then run through a padder/roller to remove excess of the dispersion and to obtain a certain % Wet Pick Up (WPU) (100% WPU means that after this process the substrate absorbed 100% of its own weight of the treatment dispersion before drying). Drying was carried out as indicated in the Examples.

COMPARATIVE EXAMPLES

Comparative Examples 1-7

Comparative Examples 1-7 were, in order: 2,4,6,8-Tetramethyl cyclotetrasiloxane, hexene, decene, dodecane, hexadecane, octadecane, and hexacosane.

Comparative Example 8

The following were mixed together at room temperature in a 500-milliliter round bottom flask equipped with a condenser: 148 grams octadecyl isocyanate, 29 grams allyl alcohol, and 0.1 gram dibutyltin dilaurate, and magnetically stirred at 70° C. for 24 hours. Allyl octadecyl carbamate was obtained as pale yellow solid (176 grams, 99% yield).

Comparative Example 9

ALPHAPLUS 1-hexene, 33.6 grams, was added at room temperature to a 500-milliliter round bottom flask equipped with a condenser. Next, mixture of 24 grams of 2,4,6,8-tetramethyl cyclotetrasiloxane and 0.024 gram of Karstedt's catalyst solution was added to the flask at room temperature followed by heating at 50° C. and stirring for 6-8 hours. 2,4,6,8-Tetramethyl-tetra-hexyl cyclotetrasiloxane was obtained as viscous liquid (57 grams, 99% yield).

Comparative Example 10

ALPHAPLUS 1-decene, 56 grams, was added at room temperature to a 500-milliliter round bottom flask equipped with a condenser. Next, a mixture of 24 grams 2,4,6,8-tetramethyl cyclotetrasiloxane and 0.024 gram of Karstedt's catalyst solution was added to the flask at room temperature followed by heating at 70° C. and stirring for 6-8 hours. 2,4,6,8-Tetramethyl-tetra-decyl cyclotetrasiloxane was obtained as viscous liquid (79 grams, 98% yield).

Comparative Example 11

ALPHAPLUS 1-dodecene, 67.2 grams, was added at room temperature to a 500-milliliter round bottom flask equipped with a condenser. Next, mixture of 24 grams of 2,4,6,8-tetramethyl cyclotetrasiloxane and 0.024 gram of Karstedt's catalyst solution was added to the flask at room temperature followed by heating at 80° C. and stirring for 6-8 hours. 2,4,6,8-Tetramethyl-tetra-dodecyl cyclotetrasiloxane was obtained as viscous liquid (91 grams, 99% yield).

EXAMPLES

Example 1

Tetradecene, 80 grams, was added at room temperature to a 500-milliliter round bottom flask equipped with a condenser. Next, a mixture of 25 grams 2,4,6,8-tetramethyl cyclotetrasiloxane and 0.024 gram of Karstedt's catalyst solution was added to the flask at room temperature followed by heating at 80° C. and stirring for 6-8 hours. 2,4,6,8-Tetramethyl-tetra-tetradecyl cyclotetrasiloxane was obtained as waxy solid (102 grams, 99% yield) (Formula (I) wherein $L^1=L^2$=single bond; $R^1=^2$ methyl; $R^3=R^4$=C14 alkyl; m=4; and n=0).

Example 2

ALPHAPLUS 1-hexadecene, 89 grams, was added at room temperature to a 500-milliliter round bottom flask equipped with a condenser. Next, a mixture of 24 grams of 2,4,6,8-tetramethyl cyclotetrasiloxane and 0.024 gram of Karstedt's catalyst solution was added to the flask at room temperature followed by heating at 80° C. and stirring for 6-8 hours. 2,4,6,8-Tetramethyl-tetra-hexadecyl cyclotetrasiloxane was obtained as white solid (112 grams, 99% yield) (Formula (I) wherein $L^1=L^2$=single bond; $R^1=R^2$=methyl; $R^3=R^4$=C16 alkyl; m=4; and n=0).

Example 3

ALPHAPLUS 1-octadecene, 101 grams, was added at room temperature to a 500-milliliter round bottom flask equipped with a condenser. Next, a mixture of 24 grams of 2,4,6,8-tetramethyl cyclotetrasiloxane and 0.024 gram of Karstedt's catalyst solution was added to the flask at room temperature followed by heating at 80° C. and stirring for 6-8 hours. 2,4,6,8-Tetramethyl-tetra-octadecyl cyclotetrasiloxane was obtained as white solid (125 grams, 99% yield) (Formula (I) wherein $L^1=L^2$=single bond; $R^1=R^2$=methyl; $R^3=R^4$=C18 alkyl; m=4; and n=0).

Example 4

ALPHAPLUS C26-28, 151.2 grams, was added at room temperature to a 500-milliliter round bottom flask equipped with a condenser followed by heating at 90° C. for one hour. Next, mixture of 24 grams of 2,4,6,8-tetramethyl cyclotetrasiloxane and 0.048 gram of Karstedt's catalyst solution was added to the flask at 100° C. followed by stirring for 6-8 hours. 2,4,6,8-Tetramethyl-tetra-C26-28 cyclotetrasiloxane was obtained as white solid (174 grams, 99% yield) (Formula (I) wherein $L^1=L^2=$single bond; $R^1=R^2=$methyl; $R^3=R^4=$C26-C28 alkyl (mixture); m=4; and n=0).

Example 5

ALPHAPLUS C30+HA, 194 grams, was added at room temperature to a 500-milliliter round bottom flask equipped with a condenser followed by heating at 100° C. for one hour. Next, a mixture of 24 grams of 2,4,6,8-tetramethyl cyclotetrasiloxane and 0.048 gram of Karstedt's catalyst solution was added to the flask at 100° C. followed by stirring for 6-8 hours. 2,4,6,8-Tetramethyl-tetra-C30 cyclotetrasiloxane was obtained as white solid (218 grams, 99% yield) (Formula (I) wherein $L^1=L^2=$single bond; $R^1=R^2=$methyl; $R^3=R^4=$C30+ alkyl (mixture); m=4; and n=0).

Example 6

Octadecyl allyl carbamate, 118 grams, was added at room temperature to a 500-milliliter round bottom flask equipped with a condenser followed by heating at 90° C. for one hour. Next, a mixture of 20 grams of 2,4,6,8-tetramethyl cyclotetrasiloxane and 0.048 gram of Karstedt's catalyst solution was added to the flask at room temperature followed by heating at 90° C. and stirring for 10-12 hours. 2,4,6,8-Tetramethyl-tetra-octadecylcarbamatopropyl cyclotetrasiloxane was obtained as pale yellow solid (136 grams, 99% yield) (Formula (I) wherein $L^1=L^2=$—$(CH_2)_n$NHC(O)O—; $R^1=R^2=$methyl; $R^3=R^4=$C18 alkyl; m=0; and n=4).

Example 7

A mixture of 50.5 grams ALPHAPLUS 1-octadecene and 16.8 grams of ALPHAPLUS 1-hexene was added at room temperature to a 500-milliliter round bottom flask equipped with a condenser. Next, a mixture of 24 grams of 2,4,6,8-tetramethyl cyclotetrasiloxane and 0.024 gram of Karstedt's catalyst solution was added to the flask at room temperature followed by heating at 80° C. and stirring for 6-8 hours. 2,4,6,8-Tetramethyl-2,4,6,8 (octadecyl-co-hexyl) cyclotetrasiloxane was obtained as white waxy solid (91 grams, 99% yield) (Formula (I) wherein $L^1=L^2=$single bond; $R^1=R^2=$methyl; $R^3=$C18 alkyl; $R^4=$—$(CH_2)_5CH_3$; m=2; and n=2).

Example 8

A mixture of 101 grams of ALPHAPLUS 1-octadecene and 1.14 grams of allyl glycidoxy ether was added at room temperature to a 500-milliliter round bottom flask equipped with a condenser. Next, mixture of 24 grams of 2,4,6,8-tetramethyl cyclotetrasiloxane and 0.024 gram of Karstedt's catalyst solution was added to the flask at room temperature followed by heating at 80° C. and stirring for 6-8 hours. 2,4,6,8-Tetramethyl 2,4,6,8 (octadecyl-co-glycidoxypropyl) cyclotetrasiloxane was obtained as white solid (101 grams, 99% yield) (Formula (I) wherein $L^1=$single bond; $L^2=$—$(CH_2)_3$—; $R^1=R^2=$methyl; $R^3=$C18 alkyl; $R^4=$—(O)$CH_2$CHOCH$_2$; m=3.9; and n=0.1).

TABLE 1

Results

| Example | Materials | Contact Angle (degrees) |
|---|---|---|
| C1 | 2,4,6,8-Tetramethyl cyclotetrasiloxane | 93.6 |
| C2 | Hexene | 86.2 |
| C3 | Decene | 89.0 |
| C4 | Dodecane | 89.3 |
| C5 | Hexadecane | 90.0 |
| C6 | Octadecane | 92.4 |
| C7 | Hexacosane | 93.1 |
| C8 | Allyl Octadecyl Carbamate | 93.5 |
| C9 | 2,4,6,8-Tetramethyl Tetra-Hexyl Cyclotetrasiloxane | 95.0 |
| C10 | 2,4,6,8-Tetramethyl Tetra-Decyl Cyclotetrasiloxane | 95.0 |
| C11 | 2,4,6,8-Tetramethyl Tetra-Dodecyl Cyclotetrasiloxane | 96.0 |
| 1 | 2,4,6,8-Tetramethyl Tetra-Tetradecyl Cyclotetrasiloxane | 101.4 |
| 2 | 2,4,6,8-Tetramethyl Tetra-Hexadecyl Cyclotetrasiloxane | 104.1 |
| 3 | 2,4,6,8-Tetramethyl Tetra-Octadecyl Cyclotetrasiloxane | 105.0 |
| 4 | 2,4,6,8-Tetramethyl Tetra-C26-28 Cyclotetrasiloxane | 104.7 |
| 5 | 2,4,6,8-Tetramethyl Tetra-C30 Cyclotetrasiloxane | 104.5 |
| 6 | 2,4,6,8-Tetramethyl Tetra-Octadecylcarbamatopropyl Cyclotetrasiloxane | 103.8 |
| 7 | 2,4,6,8-Tetramethyl 2,4,6,8 (Octadecyl-co-hexyl) Cyclotetrasiloxane | 104.0 |
| 8 | 2,4,6,8-Tetramethyl 2,4,6,8 (Octadecyl-co-glycidoxypropyl) Cyclotetrasiloxane | 103.4 |

*C: Comparative

Example 9

Thirty (30) grams of the cyclic siloxane of Example 5 was dissolved in 45 grams of ethylacetate at 65° C. in a 250-milliliter three-neck round-bottomed flask. To this was added a solution containing 90 grams of deionized water, 0.8 gram ETHOQUAD C-12, 1.8 grams TERGITOL TMN-6, and 0.9 gram of TERGITOL 15-S-30, also at 65° C. The mixture was stirred for 15 minutes at 65° C., and then was homogenized by passing the mixture two times through a homogenizer (Model HC8000, Microfluidics Corp., Westwood, MA), at 65° C. Ethyl acetate was then removed by vacuum distillation at 40° C. The solids content of the obtained Example 5 cyclic siloxane emulsion was 20.5%.

Treatment baths were prepared by diluting 6.97 grams of the Example 5 cyclic siloxane emulsion with 93.03 grams of deionized water. Treatments were applied to nylon (NTD) and polyester (PPP) fabric substrates according to the Treatment Procedure via "Padding" Process to provide a concentration as indicated in Table 2 (based on fabric weight and indicated as SOF (solids on fabric)). The samples were then dried and cured (150-170° C. for 1-5 minutes). After drying and heat curing, the treated fabrics were tested for their dynamic water repellent properties using the Spray Rating (SR) test.

Example 10

Thirty (30) grams of the cyclic siloxane of Example 4 was dissolved in 45 grams of ethylacetate at 65° C. in a 500- milliliter three-neck round-bottomed flask. To this was added a solution containing 130 grams of DI water, 0.75 gram ETHOQUAD C-12, 1.8 grams TERGITOL TMN-6, and 0.9 gram of TERGITOL 15-S-30, also at 65° C. The mixture was vigorously stirred for 15 minutes at 65° C., and then was then homogenized by passing the mixture two times through a homogenizer (Model HC8000, Microfluidics Corp., Westwood, MA), at 65° C. Ethyl acetate was then removed by vacuum distillation at 40° C. The solids content of the obtained Example 4 cyclic siloxane emulsion was 18.9%.

Treatment baths were prepared by diluting 7.56 grams of the Example 4 cyclic siloxane emulsion with 92.44 grams of deionized water. Treatments were applied to nylon (NTD) and polyester (PPP) fabric substrates according to the Treatment Procedure via "Padding" Process to provide a concentration as indicated in Table 2 (based on fabric weight and indicated as SOF (solids on fabric)). The samples were then dried and cured (150-170° C. for 1-5 minutes). After drying and heat curing, the treated fabrics were tested for their dynamic water repellent properties using the Spray Rating (SR) test.

Example 11

Thirty (30) grams of the cyclic siloxane of Example 3 was dissolved in 45 grams of ethyl acetate at 65° C. in a 500-milliliter three-neck round-bottomed flask. To this was added a solution containing 130 grams of DI water, 0.75 gram ETHOQUAD C-12, 1.8 grams TERGITOL TMN-6, and 0.9 gram of TERGITOL 15-S-30, also at 65° C. The mixture was vigorously stirred for 15 minutes at 65° C., and then was then homogenized by passing the mixture two times through a homogenizer (Model HC8000, Microfluidics Corp., Westwood, MA), at 65° C. Ethyl acetate was then removed by vacuum distillation at 40° C. The solids content of the obtained Example 3 cyclic siloxane emulsion was 20.2%.

Treatment baths were prepared by diluting 7.07 grams of the Example 3 emulsion with 92.93 grams of deionized water. Treatments were applied to nylon (NTD) and polyester (PPP) fabric substrates according to the Treatment Procedure via "Padding" Process to provide a concentration as indicated in Table 2 (based on fabric weight and indicated as SOF (solids on fabric)). The samples were then dried and cured (150-170° C. for 1-5 minutes). After drying and heat curing, the treated fabrics were tested for their dynamic water repellent properties using the Spray Rating (SR) test.

The Spray Rating data for Examples 9-11 are reported in Table 2. Initial Spray Rating is reported. Untreated nylon fabric (NTD) and untreated polyester fabric (PPP) samples were also tested for comparison. This data demonstrates that some cyclic siloxane compounds of the present disclosure (particularly those with one or more long (e.g., greater than C26) hydrocarbon chains) can be used in aqueous treating compositions for fibrous substrates.

TABLE 2

|  | % SOF | Spray Rating |
|---|---|---|
| PPP treated with Example 9 (73% WPU) | 1 | 50 |
| NTD treated with Example 9 (66% WPU) | 1 | 50 |
| PPP treated with Example 10 (73% WPU) | 1 | 0 |
| NTD treated with Example 10 (66% WPU) | 1 | 0 |
| PPP treated with Example 11 (73% WPU) | 1 | 0 |
| NTD treated with Example 11 (66% WPU) | 1 | 0 |

TABLE 2-continued

|  | % SOF | Spray Rating |
|---|---|---|
| Untreated NTD | 0 | 0 |
| Untreated PPP | 0 | 0 |

The complete disclosures of the patents, patent documents, and publications cited herein are incorporated by reference in their entirety as if each were individually incorporated. To the extent that there is any conflict or discrepancy between this specification as written and the disclosure in any document that is incorporated by reference herein, this specification as written will control. Various modifications and alterations to this disclosure will become apparent to those skilled in the art without departing from the scope and spirit of this disclosure. It should be understood that this disclosure is not intended to be unduly limited by the illustrative embodiments and examples set forth herein and that such examples and embodiments are presented by way of example only with the scope of the disclosure intended to be limited only by the claims set forth herein as follows.

What is claimed is:

1. A cyclic siloxane compound of Formula (I):

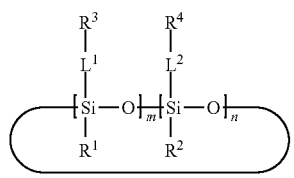

wherein:
each $R^1$ and $R^2$ is independently a (C1-C4)alkyl;
for $L^1$, either (i) each $L^1$ is a single bond or (ii) at least a portion of the $L^1$ groups are single bonds and at least a portion of the $L^1$ groups are an alkylene bonded to a group selected from oxy, thio, carbonyl, —NH—, and combinations thereof;
each $L^2$ is independently a single bond, an alkylene, or an alkylene bonded to a group selected from oxy, thio, carbonyl, —NH—, and combinations thereof;
each $R^3$ is independently a linear (C14-C100)alkyl;
each $R^4$ is independently a (C1-C30)alkyl, a (C2-C30) heteroalkyl having at least one oxygen, sulfur, or —NH— group, or a (C1-C30)alkyl substituted with a fluoro, thiol, isocyanato, cyanato, hydroxyl, glycidoxy, or epoxy group;
with the proviso that $L^1$, $L^2$, and $R^4$ are selected such that each Si atom is directly bonded to an alkylene or an alkyl;
m is an integer of at least 2;
n is an integer of 0 or above;
m+n is an integer of at least 3; and
the cyclic siloxane compound is a solid at 25° C. wherein at least one of $L^1$ or $L^2$ is an alkylene bonded to a group selected from oxy, thio, carbonyl, —NH, and combinations thereof with the proviso that when n is 0, at least a portion of the $L^1$ groups are an alkylene bonded to a group selected from oxy, thio, carbonyl, —NH, and combinations thereof.

2. The siloxane compound of claim 1 wherein m÷(m+n) is at least 0.50.

3. The siloxane compound of claim 1 wherein m÷(m+n) is up to 1.0.

4. The siloxane compound of claim 1 wherein each $L^2$ is a single bond.

5. The siloxane compound of claim 1 wherein at least a portion of the $L^2$ groups are single bonds, and at least a portion of the $L^2$ groups are an alkylene bonded to a group selected from oxy, thio, carbonyl, —NH—, and combinations thereof.

6. The siloxane compound of claim 1 wherein each $R^4$ is independently a (C12-C30)alkyl.

7. The siloxane compound of claim 1 wherein each $R^4$ is independently a (C2-C30)heteroalkyl having at least one oxygen, sulfur, or —NH— group, or a (C1-C30)alkyl substituted with a fluoro, thiol, isocyanato, cyanato, hydroxyl, glycidoxy, or epoxy group.

8. The siloxane compound of claim 1 wherein at least a portion of the $R^4$ groups are independently a (C12-C30) alkyl, and at least a portion of the $R^4$ groups are independently a (C2-C30)heteroalkyl having at least one oxygen, sulfur, or —NH— group, or a (C1-C30)alkyl substituted with a fluoro, thiol, isocyanato, cyanato, hydroxyl, glycidoxy, or epoxy group.

9. The siloxane compound of claim 1 wherein each $R^1$ and $R^2$ is a methyl group.

10. The siloxane compound of claim 1 wherein m+n is an integer of at least 10.

11. The siloxane compound of claim 1 wherein m+n is an integer of up to 250.

12. The siloxane compound of claim 1 which has a (number average) molecular weight of at least 1000 Daltons.

13. The siloxane compound of claim 1 which has a (number average) molecular weight of up to 75,000 Daltons.

14. An article comprising:
a substrate; and
a hydrophobic layer comprising a siloxane compound of claim 1 adjacent to the substrate.

15. A treating composition comprising a siloxane compound of claim 1.

16. The article of claim 14 wherein the substrate is fibrous.

* * * * *